US009183440B2

(12) United States Patent
Bohné

(10) Patent No.: US 9,183,440 B2
(45) Date of Patent: Nov. 10, 2015

(54) IDENTIFICATION BY IRIS RECOGNITION

(75) Inventor: Julien Bohné, Issy les Moulneaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/343,048

(22) PCT Filed: Sep. 6, 2012

(86) PCT No.: PCT/EP2012/067444
§ 371 (c)(1),
(2), (4) Date: Jun. 5, 2014

(87) PCT Pub. No.: WO2013/034654
PCT Pub. Date: Mar. 14, 2013

(65) Prior Publication Data
US 2014/0294253 A1    Oct. 2, 2014

(30) Foreign Application Priority Data
Sep. 6, 2011    (FR) ...................... 1157895

(51) Int. Cl.
*G06K 9/00*    (2006.01)
*G06K 9/46*    (2006.01)
*G06K 9/62*    (2006.01)
*H04N 19/91*    (2014.01)

(52) U.S. Cl.
CPC .......... *G06K 9/00617* (2013.01); *G06K 9/0061* (2013.01); *G06K 9/4671* (2013.01); *G06K 9/6202* (2013.01); *H04N 19/91* (2014.11)

(58) Field of Classification Search
None
See application file for complete search history.

(56) References Cited

U.S. PATENT DOCUMENTS

2002/0039433 A1*    4/2002    Shin .............................. 382/117

FOREIGN PATENT DOCUMENTS

CN          1512439         7/2004
WO    WO 2007/103698 A2    9/2007

OTHER PUBLICATIONS

Daugman, J., "How Iris Recognition Works," *IEEE Transactions on Circuits and Systems for Video Technology*, vol. 14, No. 1, Jan. 2004, XP011105913, pp. 21-30.
Dong, W., et al., "Iris Matching Based on Personalized Weight Map," *IEEE Transactions on Pattern Analysis and Machine Intelligence*, vol. 33, No. 9, Sep. 2011, XP011409140, pp. 1744-1757.
(Continued)

*Primary Examiner* — Daniel Mariam
(74) *Attorney, Agent, or Firm* — Blakely Sokoloff Taylor & Zafman

(57) ABSTRACT

The invention relates to a method for identification on the basis of biometric data of an iris of an eye to be identified, including the steps of: encoding an image of the iris to be identified and a second iris image so as to obtain binary codes that are representative of the images to be compared; determining a binary similarity code from the binary code of the image of the iris to be identified and the second binary code of the second iris image; determining a confidence score on the basis of the local densities of similarities between the two compared iris images, as well as on the basis of the binary similarity code, the local similarity densities being in turn determined on the basis of the binary similarity code; and deciding, depending on the value of the confidence score, whether or not the two iris images are from the same iris. The invention also relates to a system suitable for implementing the identification method.

12 Claims, 2 Drawing Sheets

(56) References Cited

OTHER PUBLICATIONS

Hollingsworth, K.P., et al, "The Best Bits in an Iris Code," *IEEE Transactions on Pattern Analysis and Machine Intelligence*, vol. 31, No. 6, Jun. 2009, XP011266637, pp. 964-973.

Search Report from French App. No. 1157895 dated Mar. 29, 2012 with English language cover sheet (4 pages).

Written Opinion from French App. No. 1157895 (6 pages)., Mar. 29, 2012.

\* cited by examiner

IDENTIFICATION BY IRIS RECOGNITION

FIELD OF THE INVENTION

The invention relates in general to the field of biometrics, and in particular the field of identification of individuals by iris recognition.

STATE OF THE ART

Methods of identification by iris recognition are already known, consisting of capturing an image of an iris of an individual to be identified with one or more known images of irises and stored in a database or on a secure identity document.

In particular, John Daugman developed a method of iris recognition, described in document U.S. Pat. No. 5,291,560, comprising the steps consisting of:

encoding iris images to be compared into a binary code whereof the bits correspond to identified zones of the irises, applying a mask to these binary codes to cancel out those bits corresponding to non-visible zones of the iris (for example those hidden by the eyelid)

confronting two binary codes with iris images to deduce therefrom a binary code identifying the coherent bits between two binary iris codes, and calculating from this code the Hamming distance, that is, the number of incoherent bits between the binary iris codes to be compared.

The more a couple of binary codes of iris images produces a minimal Hamming distance, the greater the chances that the two images from which they are extracted come from the same iris.

This method is consequently classic for the expert, and the majority of developments which have ensued aims at improving the method of encoding iris images so that processing conducted on these binary codes is the most pertinent possible. Few developments have aimed at improving the method of confrontation between a number of binary iris codes to deduce therefrom the identity of the bearer of the tested iris.

Nevertheless, it is evident that the Daugman method using the Hamming distance always commits positive errors, consisting of considering wrongly that two different images come from the same iris, and negative errors, consisting of considering wrongly that two images of the same iris come from two different irises.

PRESENTATION OF THE INVENTION

As a consequence, one of the aims of the invention is to decrease both the rate of positive and negative errors attained in the prior art. In particular, an aim of the invention is to decrease the rate of negative errors at a given rate of positive errors.

The invention proposes an alternative method of identification by iris recognition, exploiting the local densities of coherent bits between two binary codes representative of iris images.

To this end, the invention proposes an identification method from biometric data of an iris of an eye to be identified, comprising steps consisting of:

encoding an image of the iris to be identified and a second iris image to obtain binary codes representative of the images to be compared, such that adjacent bits of the binary codes correspond to adjacent zones of irises on the corresponding images, determining a binary similarity code from the binary code of the image of the iris to be identified and of the second binary code of the second iris image, determining a confidence score as a function of local densities of similarities between the two compared iris images, as well as of the binary similarity code, the local densities of similarity being themselves determined as a function of the binary similarity code, deciding, as a function of the value of the confidence score, if the two iris images come from the same iris.

The identification method proposed by the invention can also comprise at least one of the characteristics following:

the binary similarity code is a coherence map obtained by applying the operator <<exclusive or>> between the two binary codes representative of iris images.

the binary similarity code used takes into account only those bits of the coherence map corresponding to zones of the irises visible on the images.

for determining the confidence score, a measurement is calculated for each bit of the binary similarity code of local density of coherent bits between the two binary codes of the iris images in the vicinity of the relevant bit.

The confidence score is calculated by adding up, for each bit of the similarity code, the values of local densities weighted by a positive number if the bit is coherent between the two iris images, and by a negative number if the bit is incoherent between the two iris images.

The method comprises the step of standardising the confidence score obtained by dividing it by the sum of the local densities.

The method consists of iterating the preceding steps between a code of an image of an iris to be identified and N codes of iris images from a database, and from the confidence scores obtained for each couple of codes of iris images, determining a success rate of the decision made relating to the origin of the images.

The method comprises the application of the preceding steps between a code of an image of an iris to be identified and codes of iris images of a database, and determining from the confidence scores obtained iris images of the database which originate from the iris to be identified.

The obtained confidence scores can also be compared with a threshold for determining the iris images which originate from the iris to be identified.

The method consists of:
  determining a binary similarity code between an iris image to be identified and each of N iris images of a database,
  calculating, for each similarity binary code, the Hamming distance between the two compared images,
  selecting from the database of N images a second database of N' images those irises exhibiting the least Hamming distance with the image of the iris to be identified and,
  executing the method previously described on the database containing the N' iris images.

In an embodiment, the invention also relates to an identification system of an individual, comprising:

at least one acquisition system, adapted to capture at least one image of an iris of a person, a calculation platform, receiving the image acquired by the acquisition system and at least one second image to be compared to the first, the calculation platform being adapted to:

encoding the image of the iris to be identified and the second iris image to obtain binary codes representative of the images to be compared, such that adjacent bits of the binary codes correspond to adjacent zones of the irises on the corresponding images, determining a binary similarity code from the binary code of the image of the iris to be identified and of the second binary code of the second iris image, determining a confidence score as a function of local densities of similarities between the two compared iris images, as well of the binary similarity code, the local densities of similarity themselves being determined as a function of the binary similarity code, deciding, as a function of the value of the confidence score, whether the two iris images come from the same iris.

DESCRIPTION OF THE FIGURES

Other characteristics, aims and advantages of the present invention will emerge from the following detailed description with respect to the attached figures, given by way of non-limiting examples and in which.

DETAILED DESCRIPTION OF THE INVENTION

The method of the prior art described hereinabove does not take into consideration the positions on the image of the incoherent bits between the binary codes of the iris images.

Yet, some images can contain a reflection or a foreign body on a zone of the iris, and the bits of these zones can exhibit numerous differences with the corresponding bits on a different image, yet coming from the same iris.

As a consequence, it is more probable that a couple of binary codes comes from the same iris if the coherent bits (respectively the coherent bits) are concentrated in a few zones, rather than if they were spread over the entire image. The method proposed by the invention considers this element and exploits the local densities of coherent bits between couples of binary codes to identify an iris.

Figure 1:
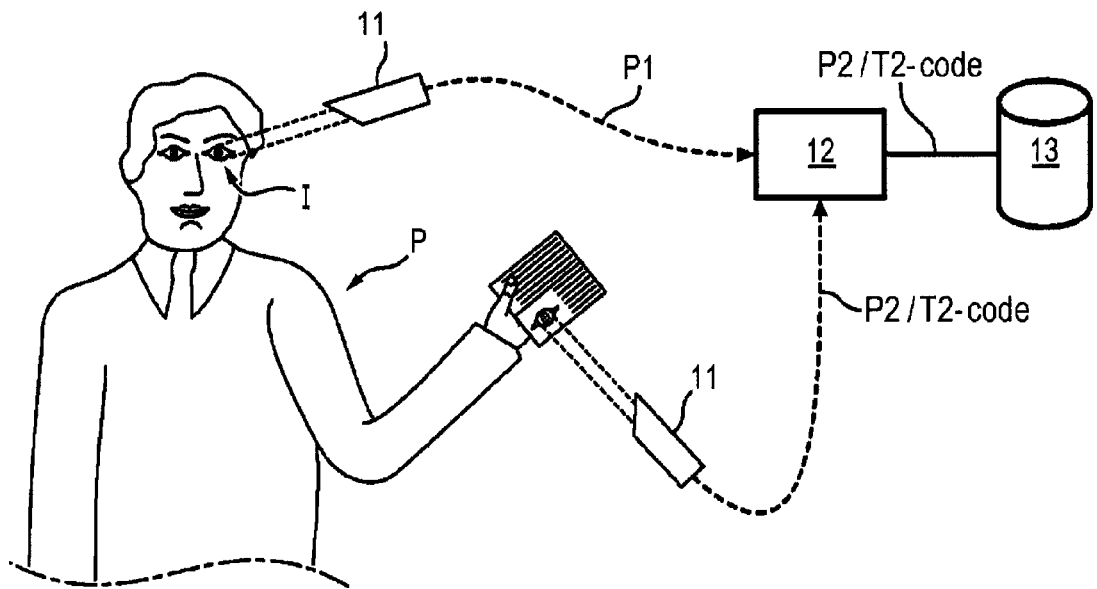
FIG. 1 illustrates an example of situation of implementation of iris recognition.

In reference to FIG. 1, this represents a situation of use of the invention.

A person P must be identified, for example before being authorised to enter secure premises. Identification is based on the recognition of an iris I of the person P.

For this to occur, an acquisition system 11 such as a camera or a photo apparatus takes an image P1 of the iris I of the person P. The image taken by the camera or the photo apparatus must have sufficient resolution to be exploitable to carry out iris recognition. For example, sufficient resolution is of the order of at least 80 pixels in an iris radius in image P1. Other conditions on the image and the acquisition system are known to the expert.

The image P1 is sent to a calculation platform 12 to be processed. In particular, the calculation platform 12 compares the image P1 to another image P2, coming either from a set of images of a database 13, or from an image of an iris of the person (the same iris as that from which the image is taken by the acquisition system 11) featured on a secure identity document of the person. In the latter case this image can be scanned or collected by any known acquisition system 11 (for example camera, scanner, photo apparatus, etc.) and sent to the calculation platform 12.

It is the calculation platform 12 which executes the identification method according to the invention and determines the identity of the person.

Figure 2:
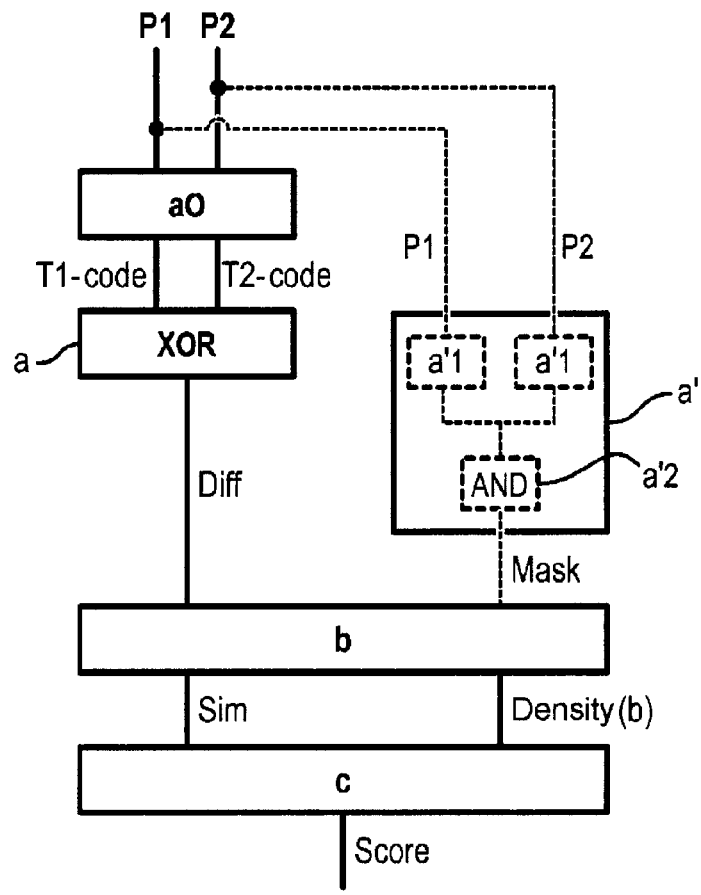
FIG. 2 illustrates the principal steps of the identification method proposed by the invention, FIG. 3 schematically illustrates the equivalence between a binary iris code and an iris image.

The identification method according to the invention, whereof the principal steps are shown in FIG. 2 will now be described.

a0. Coding of Iris Images

When the calculation platform 12 has received the image P1 coming directly from the person P, it launches a coding algorithm to obtain a binary code T1_code representative of the image P1.

Figure 3:
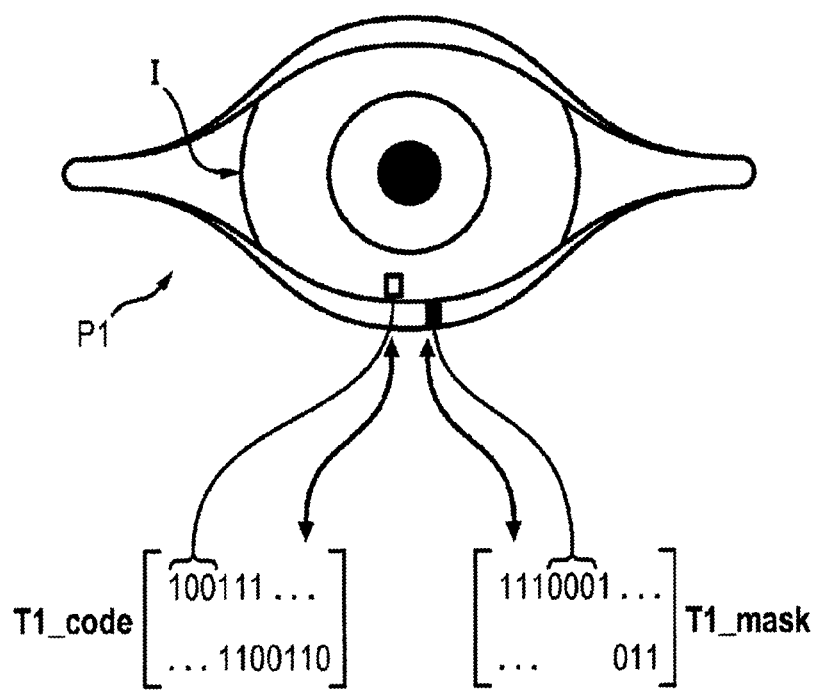

As shown schematically in FIG. 3, each bit of the binary code T1_code corresponds to a zone of the iris I of the person P, and the bits of the code adjacent to the latter correspond to zones adjacent to this zone.

Also, the value of each bit corresponds to the description of a small zone of the iris and can be obtained for example by application of a Gabor filter or a discrete cosine transform on the zone in question.

Coding per se is a technique known to the expert and therefore will not be described in more detail here. Reference could be made for example to the article by Daugman *How Iris Recognition Works* (IEEE Transactions on Circuits and Systems for Video Technology, Vol. 14, No 1, January 2004).

The second iris image P2, by which the first P1 is confronted, can be extracted from the database 13, or be sent by an acquisition system 11 to the calculation platform 12.

It can be coded by the calculation platform 12 when the latter receives it, according to the same coding as for the first image P1, to obtain a binary code T2_code representative of the second iris image P2. Alternatively, the second iris image P2 can be stored in the form of the binary code T2_code in the database 13 or in an identity document, and where necessary be sent in this form by the acquisition system 11.

a. Elaboration of a Binary Similarity Code

Once the calculation platform 12 has two binary codes T1_code and T2_code representative of the iris images P1 and P2 to be compared, it executes an algorithm which compares the binary codes to deduce therefrom a binary similarity code Sim between the two codes.

This code Sim is calculated from a coherence map Diff, obtained by conducting the binary operation <<exclusive or>>(XOR) between the two binary iris codes images, that is, if two corresponding bits in the two codes T1_code and T2_code have the same value, the corresponding bit on the coherence map Diff is 0. In other words, the 1 of the coherence map Diff correspond to the differences between the corresponding bits of the binary codes of the iris images.

Formally, this is calculated: Diff=T1_code XOR T2_code.

a'. Calculation of a Mask of Non-Visible Zones of the Iris

This coherence map Diff can be used directly as similarity code Sim. Alternatively, all the bits corresponding to zones of the iris not visible on one or the other of the images P1 and P2 can be extracted from this carte Diff. For most of the time these zones correspond to zones concealed by the eyelids.

For this, during step a'1 the calculation platform 12 can extract from the images P1 and P2 a respective mask T1_Mask and T2_mask whereof the bits at 1 correspond to zones of the iris visible on the respective images P1 and P2, as schematically illustrated in FIG. 3.

From these masks T1_Mask and T2_Mask the calculation platform 12 determines, during step a'2, a masking binary code Mask whereof the bits at 1 correspond to the intersection of the visible zones of the two irises on the images P1 and P2, that is, at the intersection of the respective masks T1_Mask and T2_Mask.

Formally, this is calculated as Mask=T1_MaskAND T2_Mask.

Only then are the coherent bits between the binary codes T1_code and T2_code considered, that is, the bits at 0 in the coherence map Diff, and which also are not masked. On the contrary no consideration is given to the value of the bits masked during subsequent operations of the process.

The similarity code Sim is therefore the coherence map Diff, in which only the non-masked bits, and which are indicated by the masking code Mask.

b. Calculation of Local Densities of Coherent Bits

As mentioned previously, to calculate a correspondence score between two iris images, the local densities of coherent bits between the binary codes corresponding are taken into account.

From then on, the algorithm is carried out on the bits b of the binary similarity code Sim.

Several ways of calculating local densities of coherent bits are feasible. For example, the calculation platform 12 can utilise a method of estimation per core, with a classic core, for example gaussian.

Alternatively, the local density of coherent bits around a bit can be calculated by defining a proximity of the relevant bit and by applying the following formula:

$$\text{density}(b) = \frac{\text{number of bits not masked at 0 in the proximity of } b}{\text{number of bits not masked in the proximity of } b}$$

b being a bit of the binary similarity code Sim.

The proximity can be defined by way of non-limiting example as the set constituted by the preceding bits and the bits following the relevant bit.

c. Determination of a Correspondence Score

Finally, the calculation platform 12 can calculate, from the local densities of coherent bits of the binary similarity code Sim and the coherent bits themselves, a score for deducing whether the two images P1 and P2 come from the same iris.

The score has the following general definition:

$$\text{score} = \frac{\sum_{b \in non\text{-}masked\ bits} f(b, \text{density}(b))}{\sum_{b \in non\text{-}masked\ bits} \text{density}(b)}$$

Several definitions are possible for the function f.

Preferably, this is a function weighting the local densities calculated during step b. by a positive number if the bit b of the similarity code Sim is 0 (i.e. if the corresponding bits of the binary codes T1_code and T2_code are coherent), and by a negative number if the bit b of the similarity code Sim is 1 (i.e. if the bits corresponding of the binary codes T1_code and T2_code are incoherent).

A function such as the following can be used, for example:

$f(b, \text{density}(b)) = \text{density}(b)$ if $b$ is 0, $f(b, \text{density}(b)) = -\text{density}(b)$ if $b$ is 1.

Finally the denominator of the score, even though not necessary to obtain a confidence score representative of the similarities between two images, standardises the latter such that the final score obtained is between −1 and 1. A more pertinent reference point for comparing several scores between couples of compared images is obtained.

The score obtained increases with the number of coherent bits between the two binary codes T1_code and T2_code of the images P1 and P2. Also, it likewise increases if the coherent bits are brought together, as the local densities of coherent bits then increase.

Consequently, the greater the score, the greater the chances for the two iris images P1 and P2 to come from the same iris.

This algorithm can be executed by testing it for a database of known iris images and deducing therefrom a success rate for the decision taken relative to the origin of iris images P1 and P2.

Also, testing this algorithm many times, can a confidence score threshold be deduced for comparing the confidence scores obtained by the method.

In particular, for the formula of the confidence score given hereinabove, if the confidence score obtained from comparing two codes of iris images T1_code and T2_code is greater than a score threshold, it is assumed that the two codes come from the same iris, with a highly reduced error rate.

For example, for a score threshold of 0.3, the rate of false positive will be around 0.01% to a rate of negative errors of less than 3% on an average quality base.

Finally, to improve the speed of execution of the algorithm, in the event where une iris image P1 is compared to a set of N images of a database, this can also be combined with the algorithm revealed by Daugman.

This consists of calculating, for each iris image P1/image of the database P2 couple, the binary similarity code Diff then the Hamming distance between the two binary codes.

N' images of the database showing the smallest Hamming distance are then selected, that is, the greatest similarity, with the iris image P1 to be identified.

Then, once this preselection is completed, the algorithm described hereinabove can be implemented, comprising steps a. b. and c. between the N' images selected and the iris image P1 to be identified. The maximal score obtained identifies the person providing the iris image P1, with negative error rates at a fixed positive error rate of around 15% (relative) less than those obtained with the sole use of the Hamming distance.

The invention is not however limited to the situations described in the present document and can be used in any other situation implementing identification by iris recognition.

The invention claimed is:

1. An identification method from biometric data of an iris (I) of an eye of a person to be identified, comprising:
    encoding an image (P1) of the iris (I) to be identified and a second iris image (P2) to be compared to the first image (P1), to obtain binary codes (T1_code, T2_code) representative of the images to be compared, such that adjacent bits of the binary codes (T1_code, T2_code) correspond to adjacent zones of the irises on the corresponding images (P1, P2),
    determining a binary similarity code (Sim) from the binary code (T1_code) of the image (P1) of the iris (I) to be identified and of the second binary code (T2_code) of the second iris image (P2),
    determining a confidence score as a function of local densities of similarities (Density(b)) between the two compared irises images (P1, P2), as well as of the binary similarity code (Sim), the local densities of similarity themselves being determined as a function of the binary similarity code (Sim),
    deciding, as a function of the value of the confidence score, whether the two iris images (P1, P2) come from the same iris.

2. The identification method according to claim 1, wherein the similarity binary code (Sim) is a coherence map (Diff) obtained by applying the operator «exclusive or» between the two binary codes (T1_code, T2_code) representative of the iris images (P1, P2).

3. The identification method according to claim 2, wherein the binary similarity code (Sim) used takes into account only those bits of the coherence map (Diff) corresponding to zones of irises visible on the images (P1, P2).

4. The identification method according to claim 1, wherein to determine the confidence score a measurement of local density (Density(b)) of coherent bits between the two binary codes (T1_code, T2_code) of the iris images (P1, P2) in the vicinity of the relevant bit is calculated for each bit of the binary similarity code (Sim).

5. The identification method according to claim 4, wherein the confidence score is calculated by adding up, for each bit of the similarity code (Sim), the calculated measurement of each of the local densities (Density(b)) weighted by a positive number if the bit is coherent between the two iris images (P1, P2), and a negative number if the bit is incoherent between the two iris images (P1, P2).

6. The identification method according to claim 5, wherein the confidence score is also standardised by dividing it by a sum of the local densities.

7. The identification method comprising iterating the steps of the method as claimed in claim 1, 2, 3, 4, 5 or 6, between a code of an image of an iris to be identified and N codes of iris images from a database (13), and from the confidence scores obtained for each couple of codes of iris images, determining a success rate of the decision made relating to an origin of the images.

8. The identification method during which the method as claimed in claim 1 is applied between a code (T1_code) of an image (P1) of the iris (I) to be identified and codes (T2_code) of iris images (P2) from a database (13), and the iris images (P2) of the database (13) which originate from the iris (I) to be identified are determined from the confidence scores obtained.

9. The identification method according to claim 8 wherein a comparison is made of the confidence scores obtained with a threshold for determining the iris images (P2) which originate from the iris (I) to be identified.

10. The identification method comprising:
determining a binary similarity code (Diff) between an image (P1) of an iris (I) to be identified and each of N iris images (P2) from a database (13),
calculating, for each binary similarity code (Diff), a Hamming distance between the two compared images,
selecting from the database (13) of N images a second database of N' images of irises having a smallest Hamming distance with the image (P1) of the iris (I) to be identified and,
executing the method according to claim 9 on the database containing the N' iris images.

11. An identification method comprising:
determining a binary similarity code (Diff) between an image (P1) of an iris (I) of a person to be identified and each of N iris images (P2) from a database (13),
calculating, for each binary similarity code (Diff), a Hamming distance between the two compared images,
selecting from the database (13) of N images a second database of N' images of irises having a smallest Hamming distance with the image (P1) of the iris (I) to be identified and,
executing the method according to claim 8 on the database containing the N' iris images.

12. An identification system of an individual, comprising:
at least one acquisition system (11), arranged to capture at least one image (P1) of an iris (I) of a person (P),
a calculation platform (12), receiving the image (P1) acquired by the acquisition system (11) and at least one second image (P2) to be compared to the first (P1),
the system being characterised in that the calculation platform (12) is arranged for:
encoding the image (P1) of the iris (I) of the person (P) to be identified and the second iris image (P2) to obtain binary codes (T1_code, T2_code) representative of the images to be compared, such that adjacent bits of the binary codes (T1_code, T2_code) correspond to adjacent zones of the iris on the corresponding images (P1, P2)
determining a binary similarity code (Sim) from the binary code (T1_code) of the image (P1) of the iris (I) of the person to be identified and of the second binary code (T2_code) of the second iris image (P2),
determining a confidence score as a function of local densities of similarities (Density(b)) between the two iris compared images (P1, P2), as well as of the binary similarity code (Sim), the local densities of similarity themselves being determined as a function of the binary similarity code (Sim),
deciding, as a function of the value of the confidence score, whether the two iris images (P1, P2) come from the same iris.

* * * * *